(12) United States Patent
Hiraguchi

(10) Patent No.: US 6,969,020 B2
(45) Date of Patent: Nov. 29, 2005

(54) RECORDING TAPE CARTRIDGE

(75) Inventor: Kazuo Hiraguchi, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/935,070

(22) Filed: Sep. 8, 2004

(65) Prior Publication Data
US 2005/0051657 A1 Mar. 10, 2005

(30) Foreign Application Priority Data
Sep. 9, 2003 (JP) .............................. 2003-316582

(51) Int. Cl.$^7$ .......................................... G11B 23/107
(52) U.S. Cl. ................. 242/332.4; 242/348.2
(58) Field of Search ......................... 242/332.4, 348, 242/348.2, 532, 532.1; 360/132

(56) References Cited

U.S. PATENT DOCUMENTS

| | | | |
|---|---|---|---|
| 4,977,474 A | * | 12/1990 | Oishi et al. .............. 242/348.2 |
| 5,465,187 A | | 11/1995 | Hoge et al. |
| 6,663,034 B1 | * | 12/2003 | Johnson et al. .......... 242/348.2 |
| 6,698,676 B2 | * | 3/2004 | Shiga et al. .............. 242/348.2 |
| 6,702,217 B2 | * | 3/2004 | Hiraguchi ................ 242/348.2 |
| 6,764,038 B2 | * | 7/2004 | Morita et al. ............ 242/348.2 |
| 2001/0024343 A1 | * | 9/2001 | Shiga et al. ................ 360/132 |

* cited by examiner

Primary Examiner—William A. Rivera
(74) Attorney, Agent, or Firm—Sughrue Mion, PLLC

(57) ABSTRACT

A recording tape cartridge features a case which rotatably and vertically movably accommodates a reel on which recording tape is wound. An aperture for drawing out the recording tape is formed in a peripheral wall of the case. The aperture features a projection portion which projects upward from a lower edge thereof. A leader block for drawing out the recording tape is fixed to an end portion of the recording tape, and can close off the aperture. The cartridge further includes a first urging member, which urges the reel downward, and a second urging member, which urges the leader block downward further than an upper edge of the projection portion. The leader block is unlikely to disengage even when the case is subjected to an impact by dropping or the like, and a recording tape cartridge with little risk of the leader block and recording tape becoming damaged is provided.

18 Claims, 8 Drawing Sheets

RECORDING TAPE CARTRIDGE

CROSS-REFERENCE TO RELATED APPLICATION

This application claims priority under 35 USC 119 from Japanese Patent Application No. 2003-316582, the disclosure of which is incorporated by reference herein.

BACKGROUND OF THE INVENTION

1. Field of the Invention

The present invention relates to a recording tape cartridge which accommodates, in a case, a single reel onto which recording tape such as a magnetic tape or the like is wound, principally for use as a recording/replaying medium for computers and the like.

2. Description of the Related Art

Conventionally, a recording tape cartridge (magnetic tape cartridge) at which a magnetic tape, which serves as a recording tape to be used as a data recording/replaying medium for computers or the like, is wound onto a single reel and this reel is accommodated in a case produced of synthetic resin has been well known. At a distal end (a free end) of such a magnetic tape, a leader member, such as a leader pin, a leader tape, a leader block or the like is fixed. A drawing-out mechanism, which is provided at a drive device, draws the leader member out through an opening aperture of the recording tape cartridge and winds the magnetic tape, which is fixed to the leader member, onto a winding reel of the drive device.

A circular opening is formed through a lower face of the recording tape cartridge. A reel gear is provided in an annular form at a lower face center of the reel and exposed through this opening. A drive gear, which is provided at a rotation shaft of the drive device, meshes with the reel gear. With this structure, the reel is driven to rotate. Hence, when the reel of the recording tape cartridge and the winding reel of the drive device are rotated at the same time, data can be recorded to the magnetic tape and/or data that has been recorded to the magnetic tape can be replayed.

At a recording tape cartridge with such a structure, the leader member is a coupling member which is coupled with the drive device side winding reel in a state in which the magnetic tape is pulled tight. However, positions of the opening aperture formed in the case and types of a door which opens and closes the opening aperture and so forth differ for the different types of leader member. For example, in a case with a leader block, the opening aperture is formed at a corner portion at a side in a direction of loading of the recording tape cartridge (the case) into a drive device, and the leader block is anchored so as to close off the opening aperture. That is, the leader block is structured so as to also serve as a door for closing the opening aperture.

This sort of leader block is structured by a stiff body. Therefore, in comparison to a tape-form leader tape, an operation of engagement with the drive device side drawing-out mechanism can be performed more easily, which is advantageous in that abrasion and damage to an engaging portion of the drawing-out mechanism is less likely to occur. Furthermore, when the opening aperture is at the corner portion of the case, this is advantageous in that an angle of drawing-out of the leader block can be freely selected in design of a drive device. For example, design is possible so as to draw out the leader block along a shortest distance to the winding reel, and design is possible so as to complete the operation of drawing-out of the magnetic tape in a short time.

However, if a leader block is anchored at a corner portion of a recording tape cartridge (a case) at times of non-use (when the recording tape cartridge is not loaded at a drive device), there is a problem in that if the corner portion is subjected to an impact, due to dropping or the like, it is likely that the case will be warpingly deformed and that the leader block will fall out from the corner portion.

When the leader block is detached and thrown out from the case due to dropping or the like, a user will consequently be subjected to concern as to whether the functionality of the recording tape cartridge has been affected, and will be subjected to concern as to whether or not the recording tape cartridge will operate in the drive device if repaired by hand. Moreover, in practice, creases may be formed in the magnetic tape when the recording tape cartridge is dropped and the leader block detaches from the case. Furthermore, when the leader block undesiredly detaches, because the leader block itself functions as a door, there is a problem in that dustproofing of the recording tape cartridge is breached.

Accordingly, it has conventionally been thought that impacts due to dropping and the like can be mitigated and effects on the leader block kept to a minimum by, for example, forming the corner portion in a form which is itself easily deformed by warping. However, such structures by themselves have been insufficient as countermeasures for preventing detachment of leader blocks.

Accordingly, as shown in FIG. 8, for example, formation of an aperture 78 in a peripheral wall 74 at a side of a recording tape cartridge 70 (a case 72) in a direction of loading into a drive device, at a position apart from a corner portion 76, and engagement of a leader block 80 with the peripheral wall 74 so as to close up the aperture 78 has been considered (see, for example, Japanese Patent Application Laid-Open (JP-A) No. 2002-298541). According to such a structure, if an impact is applied to this corner portion 76 by dropping or the like and the case 72 is warpingly deformed, the leader block 80 is unlikely to disengage from the aperture 78, because the aperture 78 is provided at a position which is separated from the corner portion 76.

However, because the leader block 80 illustrated in FIG. 8 engages with the peripheral wall 74 when closing off the aperture 78 so as to be coplanar with the peripheral wall 74 and so as to structure a portion of the peripheral wall 74, it is necessary to form the size of the aperture 78 so as to match the size of the leader block 80. Moreover, at times of non-use, because the leader block 80 is continuously in a state of being exposed to the outside, there is a problem in that the leader block 80 is susceptible to scratching and the like. Because, as mentioned above, the leader block 80 is a coupling member which couples at the drive device side winding reel, it is not preferable for dimensional accuracy of the leader block 80 to be altered by damage or the like.

Furthermore, at times of non-use, the reel is urged downward by a coil spring. Consequently, a height position of the reel may differ (become lower) relative to a height position of the leader block. Thus, the magnetic tape may get into a state which extends from the reel to the leader block at an angle in side view. If this condition arises, different tensions will be applied at upper and lower side end portions (below referred to as "edges") of the magnetic tape. Consequently, problems such as the magnetic tape twisting and the magnetic tape become creased may occur, in addition to which one of these edges may contact and rub against an upper flange of the reel, leading to the occurrence of problems with the magnetic tape being damaged.

SUMMARY OF THE INVENTION

The present invention will provide a recording tape cartridge which can make detachment of a leader block less likely when a case is subjected to an impact due to dropping or the like, and which is free of a risk of the leader block and a recording tape (magnetic tape) being damaged at times of non-use.

In order to achieve the object described above, a first aspect of the present invention is a recording tape cartridge including: a case which rotatably and vertically movably accommodates a single reel on which recording tape is wound; an aperture formed in a peripheral wall of the case for enabling drawing out of the recording tape; a projection portion which projects upward from a lower edge of the aperture; a leader block fixed to an end portion of the recording tape, the leader block being capable of being drawn out by a drawing-out mechanism of a drive device, and capable of closing the aperture; a first urging member disposed between a ceiling plate at an upper side of the case and the reel, for urging the reel downward; and a second urging member mounted at the ceiling plate at the upper side of the case, for urging the leader block that is closing the aperture downward further than the projection portion.

In the first aspect of the present invention, the projection portion is formed to project upward from the lower edge of the aperture and the leader block is urged toward a lower side relative to the projection portion by the second urging member. Thus, while the leader block is constrained from above by the second urging member, a lower portion of the leader block is disposed in a state of being covered by the projecting portion (which is a portion of the peripheral wall). Therefore, even if the recording tape cartridge is dropped, problems such as the leader block falling out will not occur. Therefore, the user will not be subjected to concern about unwanted detachment of the leader block. Further, because the leader block is disposed at the inner side of the peripheral wall, and does not protrude outward relative to the peripheral wall, a risk of damage thereto at times of non-use is small.

Further, because the reel is urged downward by the first urging member and the leader block is urged downward by the second urging member, the reel and the leader block can be constantly kept at the same height at times of non-use. As a result, problems such as the recording tape twisting and the recording tape becoming creased will not occur, and problems such as the edge of the recording tape making contact with and being damaged by an upper flange of the reel will not occur.

Further, the recording tape cartridge of the first aspect may have a structure in which, when the recording tape cartridge is loaded at the drive device, the leader block moves interlockingly with the reel at the same height as the reel.

With the structure described above, because the reel and the leader block interlockingly move at the same height when the recording tape cartridge is loaded at a drive device, heights of the reel and the leader block can be constantly kept equal at times of use. As a result, problems such as the recording tape twisting and the recording tape becoming creased will not occur, and problems such as the edge of the recording tape making contact with and being damaged by an upper flange of the reel will not occur. Further, it is consequently possible for the recording tape to be drawn out excellently.

Further again, in the recording tape cartridge of the aspect described above, the aperture may be formed in the peripheral wall of the case at a side of loading into the drive device, apart from a corner portion of the case.

In such a case, because the aperture is formed in the peripheral wall at the side of loading into a drive device but not at the corner portion, the leader block is disposed at a position which is separated from the corner portion. As a result, even if the recording tape cartridge is dropped, problems such as the leader block disengaging will not occur. Therefore, the user will be even more free of concern about unwanted detachment of the leader block.

As described above, according to the present invention, even if an impact is applied by a fall or the like, there is no risk of the leader block falling out from the recording tape cartridge (the case). Further, there is no risk of the leader block and the recording tape being damaged.

A second aspect of the present invention is a recording tape cartridge including: a case which rotatably accommodates, between a pair of plates which oppose one another, a single reel, on which recording tape is wound, such that the reel is movable between the pair of plates, the case including, between the pair of plates, a side wall which surrounds the reel, and an aperture being formed in the side wall for enabling drawing out of the recording tape; a projection portion which is formed so as to project from an edge portion of the aperture at one of the plates toward an edge portion of the aperture at the other of the plates; a leader block fixed to an end portion of the recording tape, the leader block being capable of closing the aperture when disposed at an inner side of the case relative to the projection portion, and, when the recording tape cartridge is loaded at a drive device, the leader block engaging with a portion of the drive device for enabling drawing out of the recording tape; a first urging member disposed between the other of the plates and the reel, for urging the reel toward the one of the plates; and a second urging member mounted at the other of the plates, for urging the leader block that is closing the aperture toward the one of the plates.

DETAILED DESCRIPTION OF THE INVENTION

Figure 1:
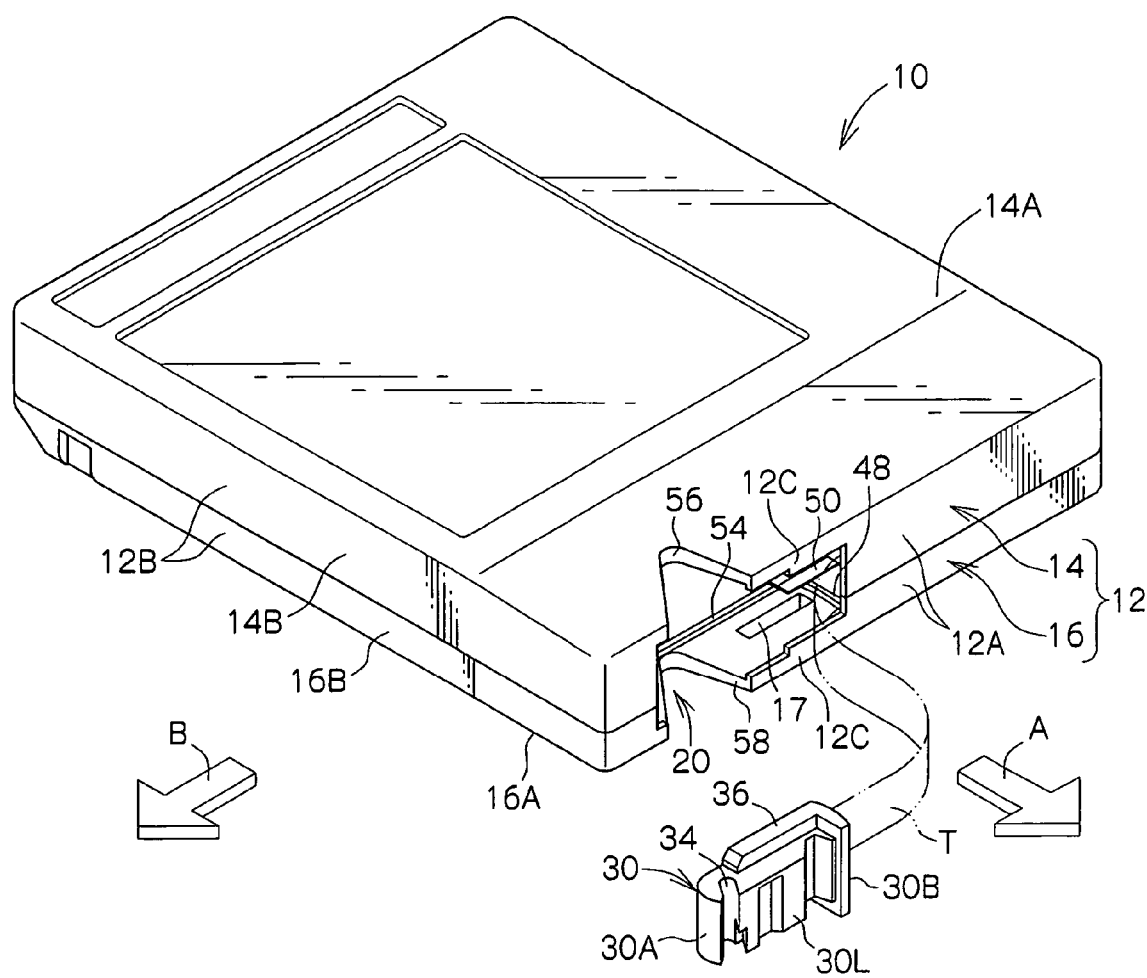
FIG. 1 is a schematic perspective view, viewed from above, of a recording tape cartridge.

Herebelow, an embodiment of the present invention will be described with reference to the modes shown in the drawings. For convenience of explanation, a loading direction of a recording tape cartridge 10 into a drive device is shown as arrow A, and is regarded as a forward direction (front side) of the recording tape cartridge 10. The direction of an arrow B, which intersects arrow A, is regarded as a rightward direction (right side).

Figure 2:
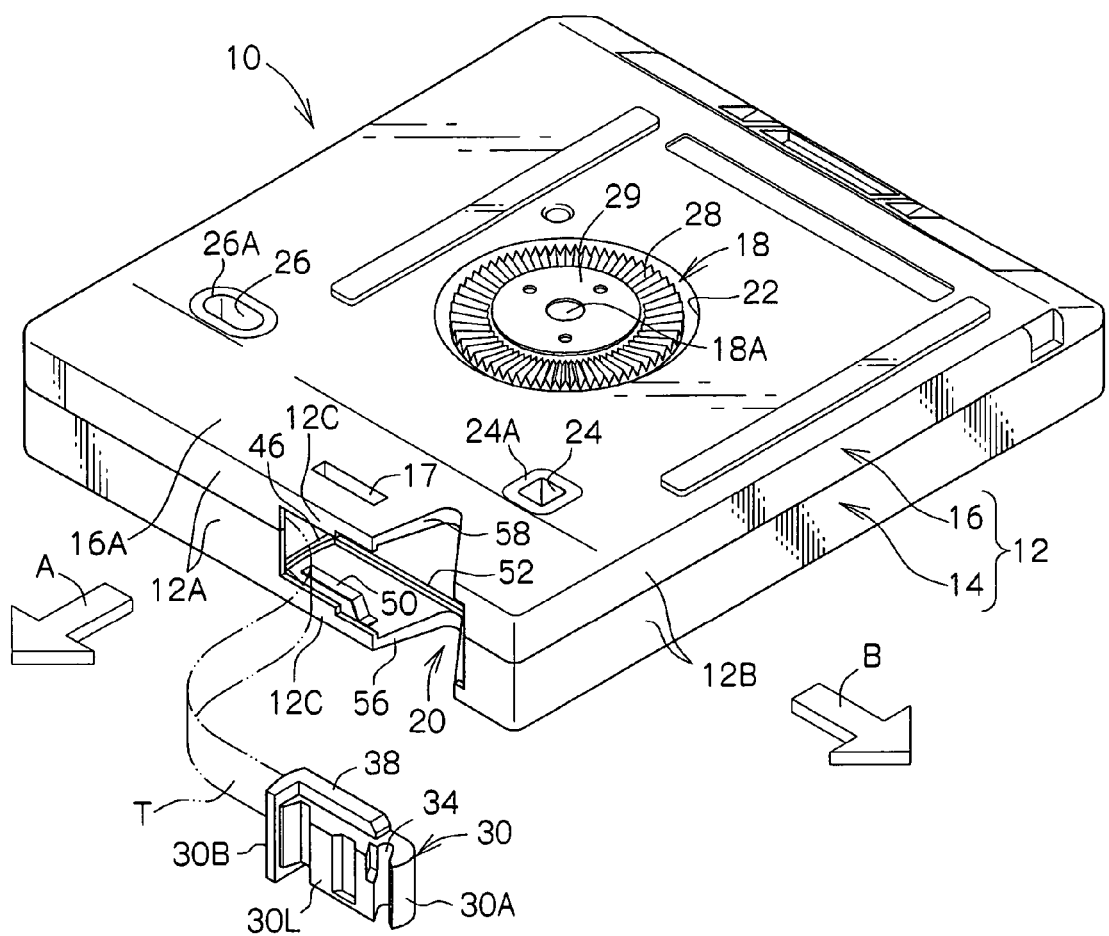
FIG. 2 is a schematic perspective view, viewed from below, of the recording tape cartridge.
Figure 3:
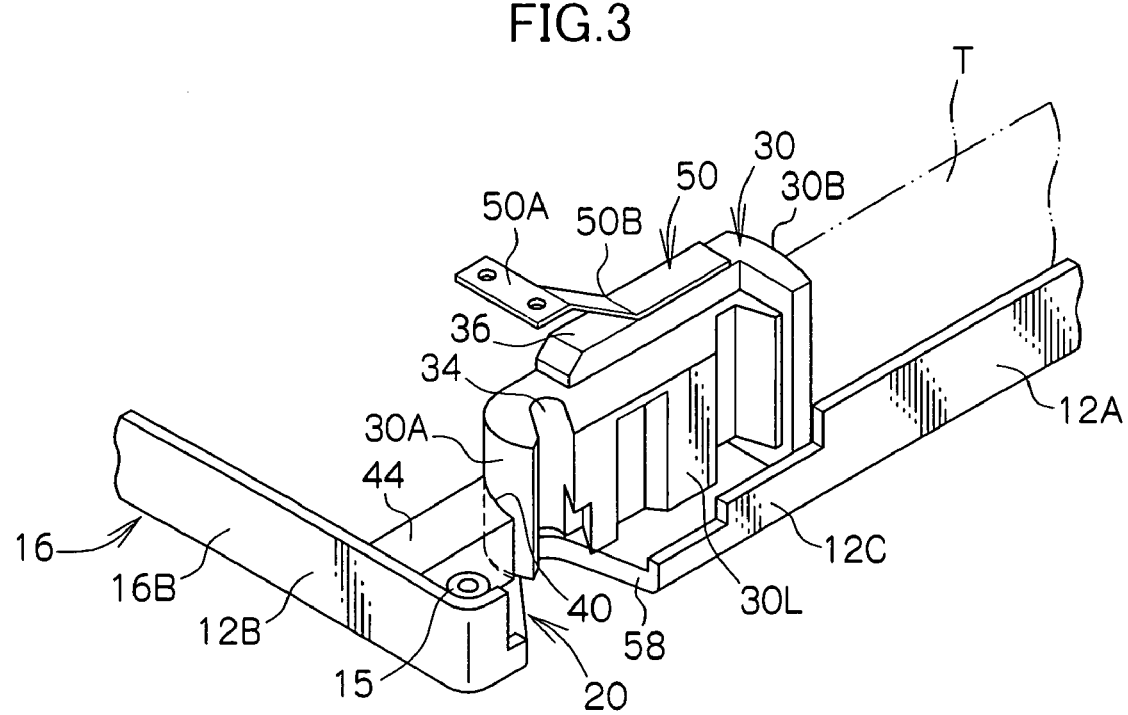
FIG. 3 is a schematic perspective view showing a leader block anchored at an inner side of an aperture.

As shown in FIGS. 1 to 3, the recording tape cartridge 10 is provided with a case 12, which is fabricated of synthetic resin. The case 12 is structured by joining together an upper case 14 and a lower case 16. More specifically, the upper case 14 is structured with a substantially frame-like peripheral wall 14B provided standing along outer edges of a ceiling plate 14A which is substantially rectangular in plan view, and the lower case 16 is structured with a peripheral wall 16B provided standing along outer edges of a floor plate 16A with a form which substantially corresponds with the ceiling plate 14A.

Thus, the case 12 is formed in a substantial box form by, in a state in which the opening end of the peripheral wall 14B and the opening end of the peripheral wall 16B are matched up, joining the upper case 14 with the lower case 16 by screw-fixing. Here, it is preferable if screw bosses 15 are provided at least at each of corner portions. With such a structure, secure joining of the upper case 14 with the lower case 16 is possible. Note that means for joining the upper case 14 with the lower case 16 is not limited to screw-fixing, and joining by ultrasonic welding or the like is also possible.

An aperture 20 is formed in the case 12 for drawing out of a magnetic tape T, which is wound on a later-described reel 18, to outside the case 12. The aperture 20 is formed at a predetermined position of a peripheral wall 12A (below referred to as front wall 12A) which is at the side of the direction of loading of the case 12 into a drive device. Specifically, the aperture 20 is formed at a position which is spaced from a right corner portion toward a left corner portion of the front wall 12A by at least a plate thickness of the case 12.

Thus, because the aperture 20 is formed in the peripheral wall (front wall 12A) apart from the corner portions, a leader block 30, which is described later, will be disposed at a position which is separated from the corner portions. Therefore, the leader block 30 will be less likely to detach from the case 12 if the recording tape cartridge 10 is dropped on a corner portion. Here, a portion of the front wall 12A is allowed to remain at least at a lower edge portion of the aperture 20. In other words, a projection portion 12C is integrally joined to at least the lower edge portion of the aperture 20. The projection portion 12C protrudes upward so as to reduce size of the aperture 20.

A circular gear aperture 22 which passes through the floor plate 16A is formed at a substantially central portion of the floor plate 16A, for exposure of a reel gear 28 which is formed at the reel 18. At a portion of the floor plate 16A at a peripheral edge of the gear aperture 22, an annular rib 23 (see FIGS. 4 to 6) is provided protruding toward the inside of the case 12. Thus, at times of non-use, the reel 18 is positioned relative to the lower case 16 by an outer peripheral side of the reel gear 28 being placed on this annular rib 23.

A pair of positioning holes 24 and 26 is formed at a front end vicinity of an outer face of the floor plate 16A of the case 12. The two positioning holes 24 and 26 are provided in the form of pockets in protrusion portions (not shown), which are provided standing from the floor plate 16A to the inside of the case 12. The positioning holes 24 and 26 are disposed to be spaced from one another along an imaginary line which intersects the loading direction. The positioning hole 24, which is at the side closer to the aperture 20, is formed in a substantially square shape, in bottom plan view, which contacts the outside of a positioning pin (not shown) of a drive device; the positioning hole 26 is formed as a long hole with length along the aforementioned imaginary line and a width corresponding to the diameter of another positioning pin (not shown) of the drive device. Accordingly, when the recording tape cartridge 10 is loaded in a drive device and the respective positioning pins are inserted into the positioning holes 24 and 26, the recording tape cartridge 10 will be accurately positioned in horizontal directions (left-right and front-rear) in the drive device.

Portions surrounding the positioning holes 24 and 26 in the floor plate 16A are formed as reference surfaces 24A and 26A, which are finished more smoothly than other portions (which are design surfaces). When the positioning pins are inserted into the positioning holes 24 and 26, the reference surfaces 24A and 26A abut against positioning surfaces (not shown) of the drive device, which are provided around the positioning pins. Thus, this structure is effective for positioning the recording tape cartridge 10 in a vertical direction in the drive device. Note that the positioning holes 24 and 26 are not limited to the positions shown in the drawings, and either may be provided at a rearward side. That is, the positioning holes 24 and 26 may be provided on a substantially diagonal line across the floor plate 16A (or in vicinities of such a diagonal line).

Only one of the reel 18 is rotatably accommodated inside the case 12 described above. The magnetic tape T, which serves as a recording tape, is wound on the reel 18. This reel 18 is formed with a height which is less than an interior dimension height of the case 12, and is formed to be vertically movable in the case 12. Further, a coil spring 60 (see FIGS. 4 to 6), which serves as a first urging member, is provided between the reel 18 and the ceiling plate 14A of the upper case 14. The reel gear 28 is formed in an annular shape at a lower face of the reel 18.

Thus, the reel 18 has a structure which is continuously urged downward by the coil spring 60 and which exposes the reel gear 28 through the gear aperture 22. The reel gear 28 is formed to be meshable with a driving gear (not shown) which is provided at a distal end of a rotating shaft (not shown) of the drive device. A reel plate 29, which is an annular plate formed of a magnetic material, is coaxially and integrally fixed at an inner side of the reel gear 28 by insert-molding or the like.

The leader block 30 is attached to a distal end of the magnetic tape T, for drawing out the magnetic tape T. Specifically, a fitting recess portion (not shown), which is substantially rectangular in side view, is formed from a right side face 30R to a rear end 30B of the leader block 30. A fitting member 32 with a substantially rectangular form (see FIGS. 4 to 6) fits into this fitting recess portion and nips a distal end portion of the magnetic tape T. As a result, the leader block 30 is fixed to the distal end of the magnetic tape T. Accordingly, a width of the fitting member 32 (a length in the height direction) is equal to or slightly larger than a width of the magnetic tape T.

The rear end 30B of the leader block 30 is formed as a circular arc surface which, when the leader block 30 is fitted into the drive device winding reel (not shown), structures a portion of a winding surface around which the magnetic tape T is to be wound. The magnetic tape T is attached substantially at a center of the rear end 30B. A front end 30A of the leader block 30 is formed in a substantially circular arc form in plan view, and an engaging recess portion 34 is formed in a vicinity of the front end 30A. The engaging recess portion 34 engages with a drawing-out member (not shown) which structures a drawing-out mechanism of the drive device. This engaging recess portion 34 is constituted by a curved surface, which forms a substantially semi-circular shape in plan view, and a straight line surface which is continuous with the curved surface.

Fitting ribs 46 and 48 with predetermined width and predetermined length are provided toward the rear side from a left edge portion of the aperture 20, standing from an inner face of the ceiling plate 14A of the upper case 14 and an inner face of the floor plate 16A of the lower case 16. A height of the fitting rib 46, which is provided at the upper case 14, is formed to be greater than a height of the fitting rib 48, which is provided at the lower case 16. These heights are such that the fitting ribs 46 and 48 will not interfere with the magnetic tape T (i.e., will form a gap therebetween through which the magnetic tape T can pass), even when the leader block 30 moves upward or downward, as will be described later. Circular arc surfaces, which correspond with the shape of the rear end 30B of the leader block 30, are formed at right side faces of the fitting ribs 46 and 48.

Further, at a vicinity of a right edge portion of the aperture 20, fitting walls 42 and 44 are provided standing, to the same heights as the peripheral walls 14B and 16B, from the inner face of the ceiling plate 14A of the upper case 14 and the inner face of the floor plate 16A of the lower case 16, respectively. A recess portion 40 is formed in a left side face of the fitting walls 42 and 44. The recess portion 40 has a substantially circular arc form in plan view, which matches an external profile of the front end 30A of the leader block 30. Thus, the front end 30A abuttingly fits in at the recess portion 40.

Further still, between rear-left end portions of the fitting walls 42 and 44 and the fitting ribs 46 and 48, engaging ribs 52 and 54 with predetermined widths, which are integrally joined with the fitting walls 42 and 44 and the fitting ribs 46 and 48, are provided standing in parallel with the front wall 12A (so as to intersect the fitting ribs 46 and 48). Heights of these engaging ribs 52 and 54 are the same as the heights of the fitting ribs 46 and 48, respectively, and are such that the engaging ribs 52 and 54 will not interfere with the magnetic tape T even when, as described later, the leader block 30 moves vertically.

At the inner face of the ceiling plate 14A of the upper case 14, a leaf spring 50, which serves as a second urging member, is mounted at the inner side of the aperture 20 by fixing means such as screw-fixing or the like. This leaf spring 50 is fabricated of metal or fabricated of resin. As shown in FIGS. 3 and 4, the leaf spring 50 is formed in a substantial 'V' shape, a distal end side relative to an attachment portion 50A thereof (a portion which is provided protruding to leftward) is inflected at a predetermined angle in front view (or side view), which is screw-fixed to the ceiling plate 14A. Further, a distal end side relative to an inflection portion SOB of the leaf spring 50 (a portion which is provided extending to leftward) abuts against an upper face of the leader block 30 that closes the aperture 20, which upper face includes a protruding rail portion 36, and the distal end side relative to the inflection portion SOB pushes the protruding rail portion 36 downward with a predetermined force.

Accordingly, at times of non-use of the recording tape cartridge 10, in a state in which a left side face 30L of the leader block 30 is facing outward, as shown in FIGS. 3 and 4, the front end 30A abuttingly fits in at the recess portion 40 of the fitting walls 42 and 44, respective upper and lower end portions of the right side face 30R (vertical direction outward sides relative to the fitting member 32), which include the protruding rail portion 36 and a protruding rail portion 38, abut against the engaging ribs 52 and 54, the rear end 30B fits at the fitting ribs 46 and 48, and the upper face of the leader block 30 including the protruding rail portion 36 is urged downward by the leaf spring 50. Thus, the leader block 30 is accommodated and retained at the inner side of the aperture 20 of the case 12. Hence, in this state, the aperture 20 is closed off by the leader block 30 and ingression of dust or the like into the case 12 is prevented.

Cutaway portions 56 and 58, which open wider than the engaging recess portion 34 in plan view, are formed, respectively, in the ceiling plate 14A of the upper case 14 and the floor plate 16A of the lower case 16, which structure upper and lower edge portions of the aperture 20, that is, which structure the aperture 20. The incision portions 56 and 58 are formed at positions which correspond with the engaging recess portion 34 of the leader block 30 when the leader block 30 has closed off the aperture 20. Consequently, when the leader block 30 is to be drawn out, the drive device side drawing-out member can be easily engaged with the engaging recess portion 34 through the incision portions 56 and 58. Further, an aperture 17 is formed through the floor plate 16A of the lower case 16. A release member 90 of the drive device will be inserted into the aperture 17 (see FIGS. 4 to 6). At times of non-use, a lower face of the leader block 30, including the protruding rail portion 38, abuts against the inner face of the lower case 16 so as to close off this aperture 17.

Next, operation of the recording tape cartridge 10 of the structure described above will be described. At times of non-use (times of storage, times of transport and the like at which the recording tape cartridge 10 is not loaded in a drive device), the aperture 20 of the recording tape cartridge 10 is closed off by the leader block 30. The aperture 20 is formed in the front wall 12A, apart from the corner portions, and the projection portion 12C is integrally provided continuously with the lower edge portion (and also with an upper edge portion in the illustrated case) of the aperture 20 so as to narrow the aperture 20 (i.e., the aperture 20 is formed such that portions of the front wall 12A remain at the upper and lower edge portions).

Figure 4A:
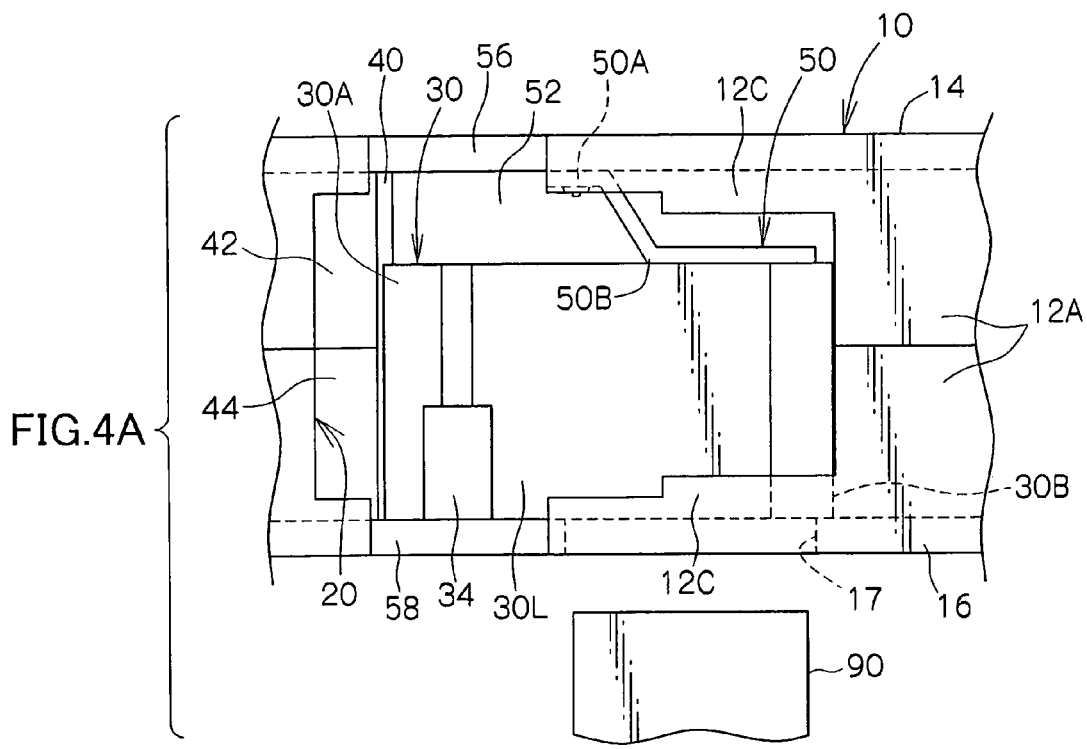
FIG. 4A is a schematic front view showing the recording tape cartridge before a release member is inserted.

Further, in the state in which the leader block 30 is urged downward by the leaf spring 50 at the inner side of the aperture 20, the leader block 30 is accommodated and retained to be parallel with the front wall 12A. That is, as shown in FIG. 4A, the leader block 30 is accommodated and retained in a state in which a portion (a lower portion) of the left side face 30L is covered by the projection portion 12C. As a result, the leader block 30 is less likely to be scratched or the like. Further, even if the recording tape cartridge 10 is accidentally dropped and an impact is applied to the case 12, because the leader block 30 is being restrained (urged downward) by the leaf spring 50, the leader block 30 is unlikely to disengage from the aperture 20. Thus, the leader block 30 is prevented from flying out from the case 12.

Figure 4B:
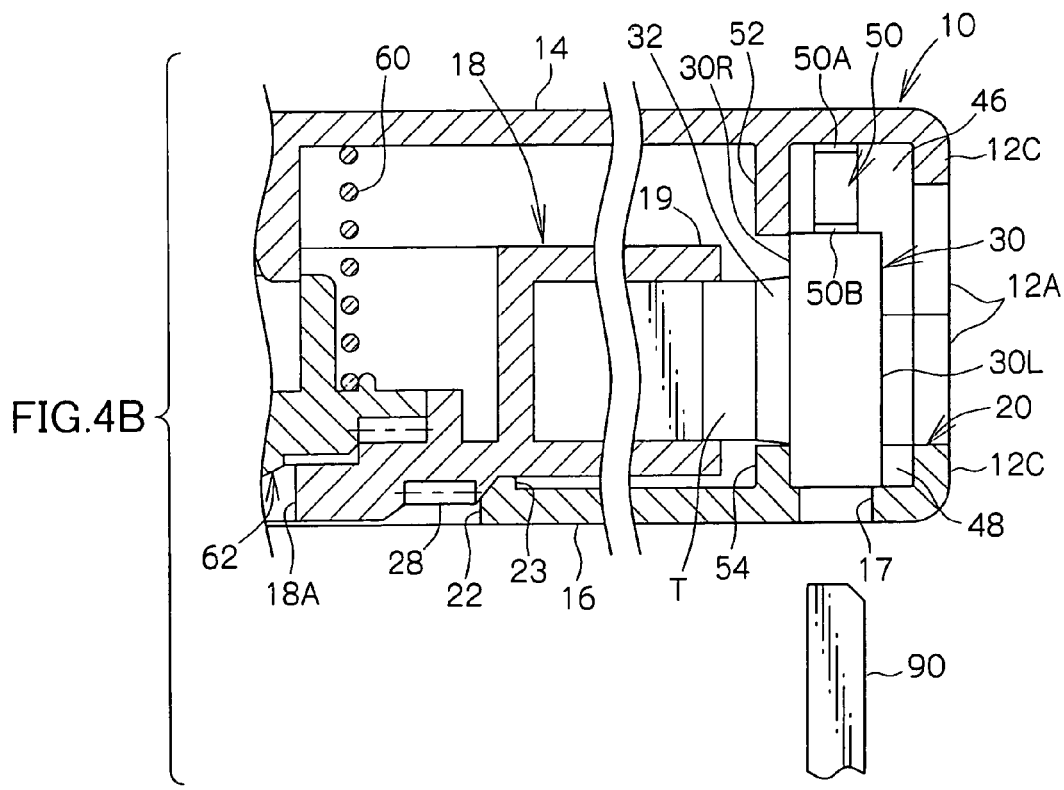
FIG. 4B is a schematic side sectional view showing the recording tape cartridge before the release member is inserted.

Further yet, because, as shown in FIG. 4B, the reel 18 is urged downward by the coil spring 60 and the leader block 30 is urged downward by the leaf spring 50, a height of the magnetic tape T is the same at both the reel 18 and the leader block 30. Therefore, problems such as the magnetic tape T twisting and the magnetic tape T becoming creased will not occur, and problems such as an edge of the magnetic tape T making contact with and being damaged by an upper flange 19 of the reel 18 will not occur.

When the recording tape cartridge 10 is to be used, the front wall 12A side thereof is oriented forward, and the recording tape cartridge 10 is loaded into a drive device along the direction of arrow A. When the recording tape cartridge 10 is loaded (inserted) into the drive device, the recording tape cartridge 10 descends to a predetermined height, or a rotation shaft (not shown) which is provided in the drive device ascends to a predetermined height. The drive device side positioning pins enter into the positioning holes 24 and 26 and restrict a horizontal direction position of the recording tape cartridge 10 (in the front-rear and left-right directions). Moreover, the drive device side positioning surfaces abut against the reference surfaces 24A and 26A and restrict the position of the recording tape cartridge 10 in the height direction. Thus, the recording tape cartridge 10 is positioned in the drive device with high accuracy.

Further, when the recording tape cartridge 10 descends to the predetermined height or the rotation shaft provided in the drive device ascends to the predetermined height, a release member (not shown), which is provided at the rotation shaft, enters through a through-hole 18A, which is formed through an axial center portion of the reel 18, and releases a locking mechanism 62 which has been blocking undesired rotation. In addition, a driving gear (not shown) which is formed at the rotation shaft meshes with the reel gear 28. Hence, at this time, the reel 18 ascends to a predetermined height.

Figure 5A:
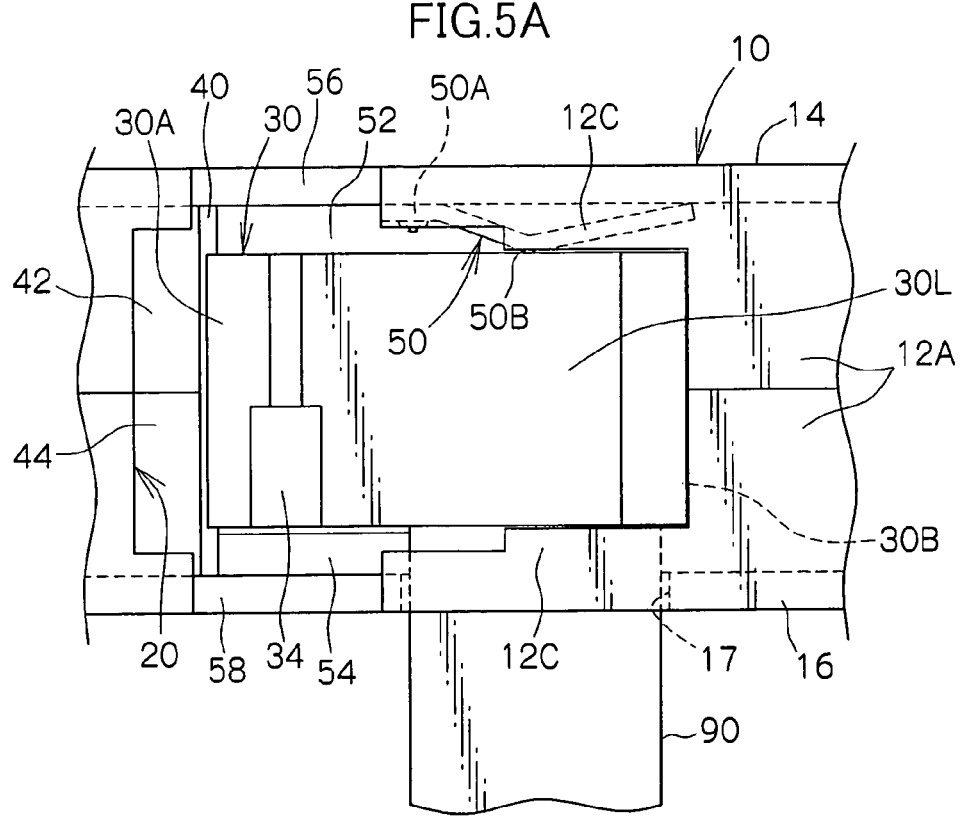
FIG. 5A is a schematic front view showing the recording tape cartridge after the release member is inserted.

At the same time, the drive device side release member 90 enters in through the aperture 17 formed through the floor plate 16A of the lower case 16, and pushes the leader block 30 upward in a width direction of the leader block 30. In consequence, as shown in FIG. 5A, the leader block 30 ascends to a predetermined height, the portion (lower portion) of the left side face 30L that has been covered by the projection portion 12C is exposed through the aperture 20, and it becomes possible to take the leader block 30 out through the aperture 20.

Figure 5B:
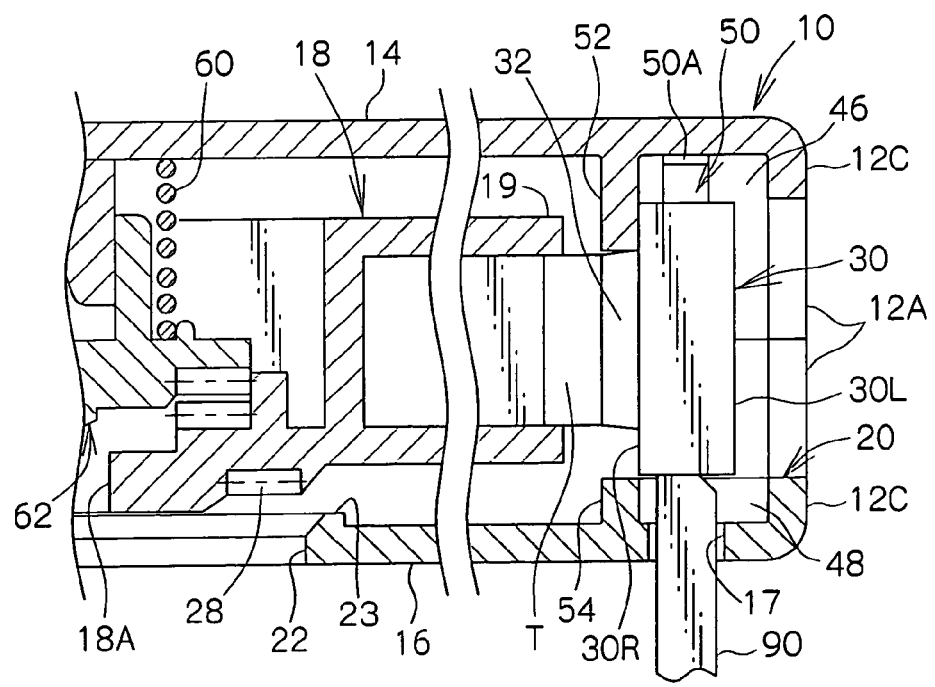
FIG. 5B is a schematic side sectional view showing the recording tape cartridge after the release member is inserted.

Here, because the ascent of the reel 18 and the ascent of the leader block 30 are interlockingly performed at the same time, as shown in FIG. 5B, height positions of the reel 18 and the leader block 30 are always the same in a width direction of the magnetic tape T. That is, the magnetic tape T ascends while being parallel with the floor plate 16A (and the ceiling plate 14A). Therefore, problems such as the magnetic tape T twisting and the magnetic tape T becoming creased will not occur even at this time, and problems such as an edge of the magnetic tape T making contact with and being damaged by the upper flange 19 of the reel 18 will not occur.

Subsequently, the drive device side drawing-out member engages with the engaging recess portion 34 of the leader block 30. At this time, because the recording tape cartridge 10 is positioned with high accuracy in the drive device and the incision portions 56 and 58 are formed in the case 12, the drawing-out member can engage with the engaging recess portion 34 of the leader block 30 reliably and simply.

Figure 6:
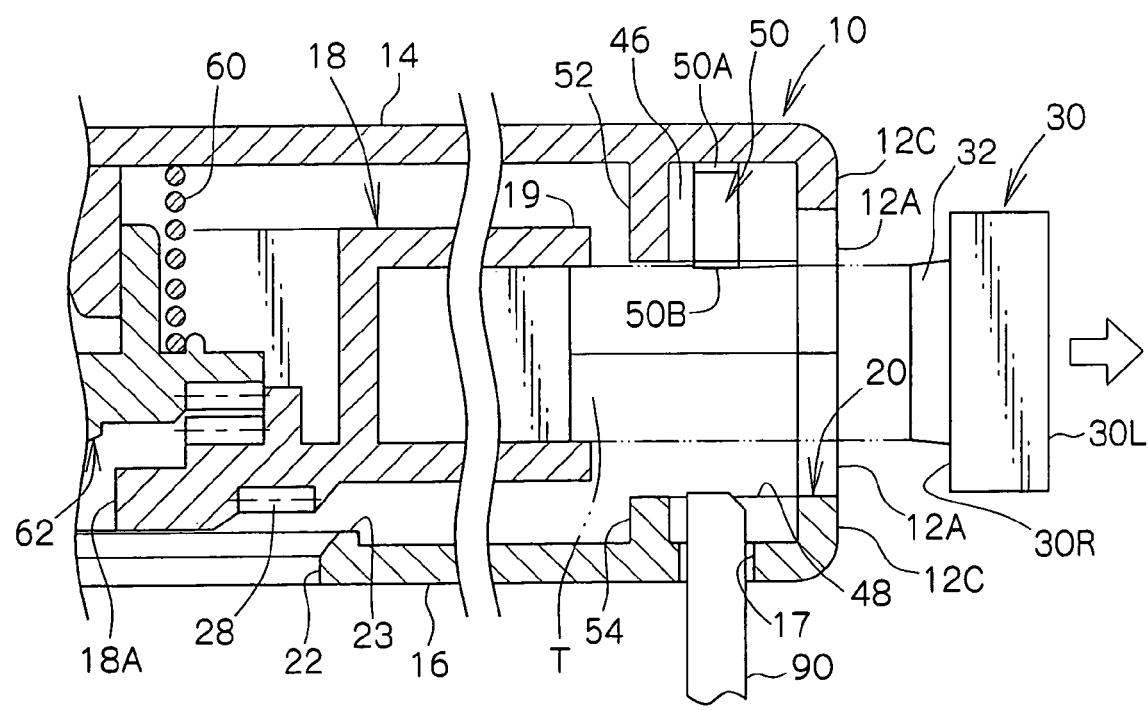
FIG. 6 is a schematic side sectional view showing the recording tape cartridge, from which the leader block has been drawn out.

Then, the leader block 30 is drawn out from inside the case 12 (through the aperture 20) by the drawing-out member moving toward the drive device side winding reel (moving in a direction away from the recording tape cartridge 10). At this time, because the height positions of the reel 18 and the leader block 30 are the same, as shown in FIG. 6, the leader block 30 (and the magnetic tape T) is drawn out from inside the case 12 in an excellent manner. Here, after the leader block 30 has been drawn out, the distal end side of the leaf spring 50 relative to the inflection portion 50B (i.e., the portion which is provided extending leftward therefrom) is moved downward by a restoring force, but does not interfere with the magnetic tape T.

The leader block 30 that has been drawn out from inside the case 12 is guided to the drive device side winding reel while remaining in a state of engagement with the drawing-out member, and is accommodated in a fitting portion (not shown) which is formed in a winding surface of the winding reel. Here, the rear end 30B of the leader block 30, which is formed as a circular arc surface, structures a portion of the winding surface. Consequently, winding of the magnetic tape T around the drive device side winding reel is enabled.

Thereafter, when the driving gear rotates for driving and causes the reel 18 to rotate synchronously with the winding reel, the magnetic tape T is wound round the winding reel while being sequentially drawn out from inside the recording tape cartridge 10. Recording and/or replaying of data (information) is carried out by a recording/replaying head, which is provided at a predetermined tape path. Of course, a guide roller or the like (not shown) is provided at a suitable position of the drive device for guiding the magnetic tape T that is drawn out from the recording tape cartridge 10, such that the magnetic tape T that is drawn out does not interfere with a left edge portion of the aperture 20 (i.e., the front wall 12A) at this time.

Figure 7A:
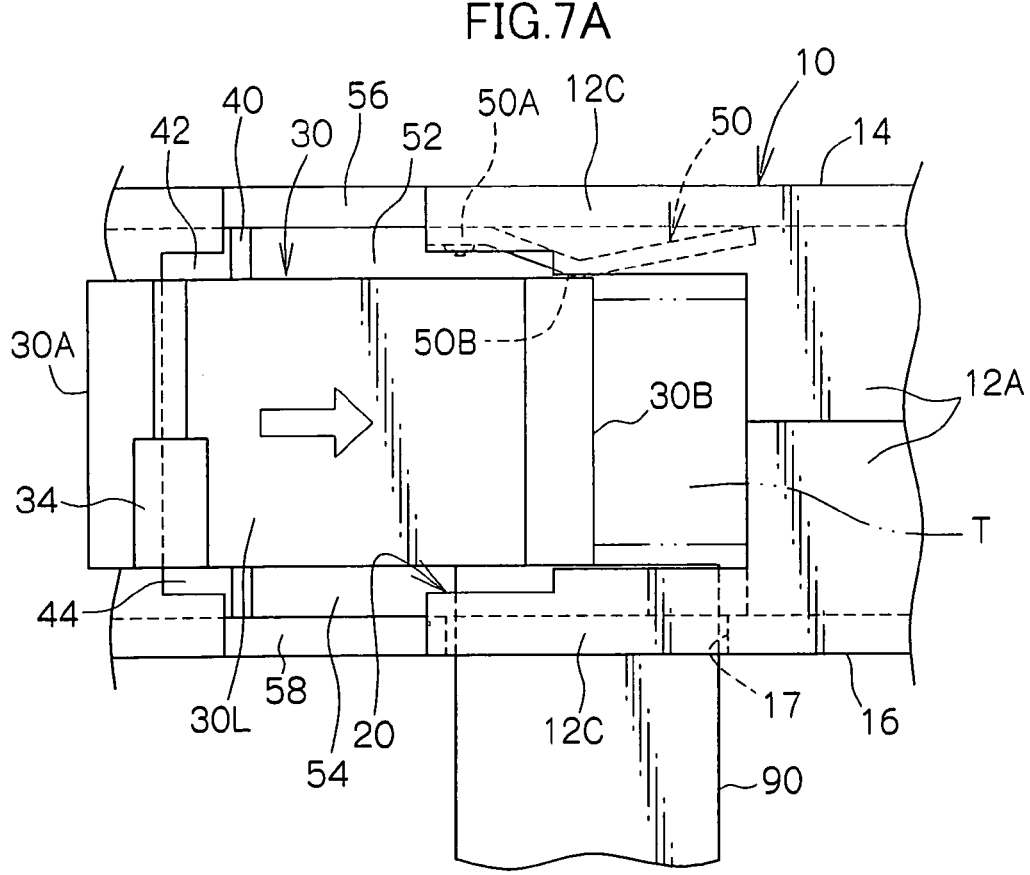
FIG. 7A is a schematic front view showing a state in which the leader block is being returned to the aperture.

Subsequently, when the recording tape cartridge 10 is to be ejected from the drive device, first the magnetic tape T is wound back to the reel 18, and the leader block 30 is returned to inside the case 12. At this time, as shown in FIG. 7A, the leader block 30 abuts against the inflection portion 50B of the leaf spring 50, and pushes the inflection portion 50B up. That is, even though the distal end side of the leaf spring 50 relative to the inflection portion 50B (i.e., the portion that is provided protruding to leftward) is disposed at a lower side relative to the upper face of the leader block 30 that is advancing into the case 12, because the inflection portion 50B which is inflected at the predetermined angle is formed relatively at the side from which the leader block 30 is advancing, the leader block 30 can be smoothly returned into the case 12 while pushing up the inflection portion 50B.

Figure 7B:
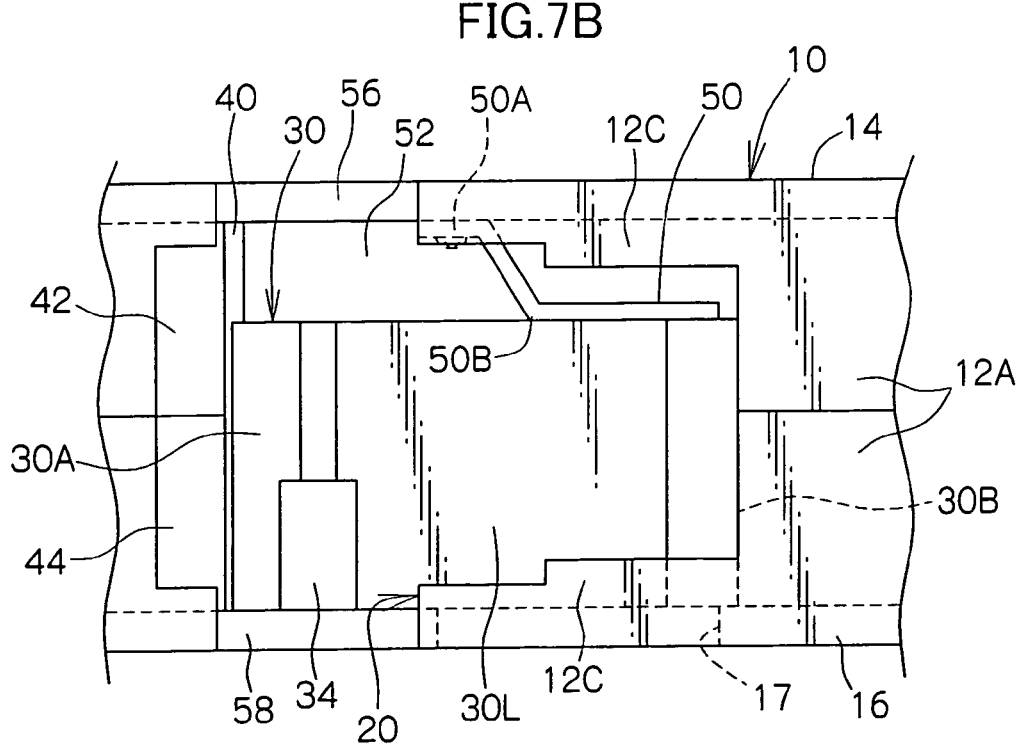
FIG. 7B is a schematic front view showing a state of a vicinity of the aperture, from which the release member has been withdrawn.
Figure 8:
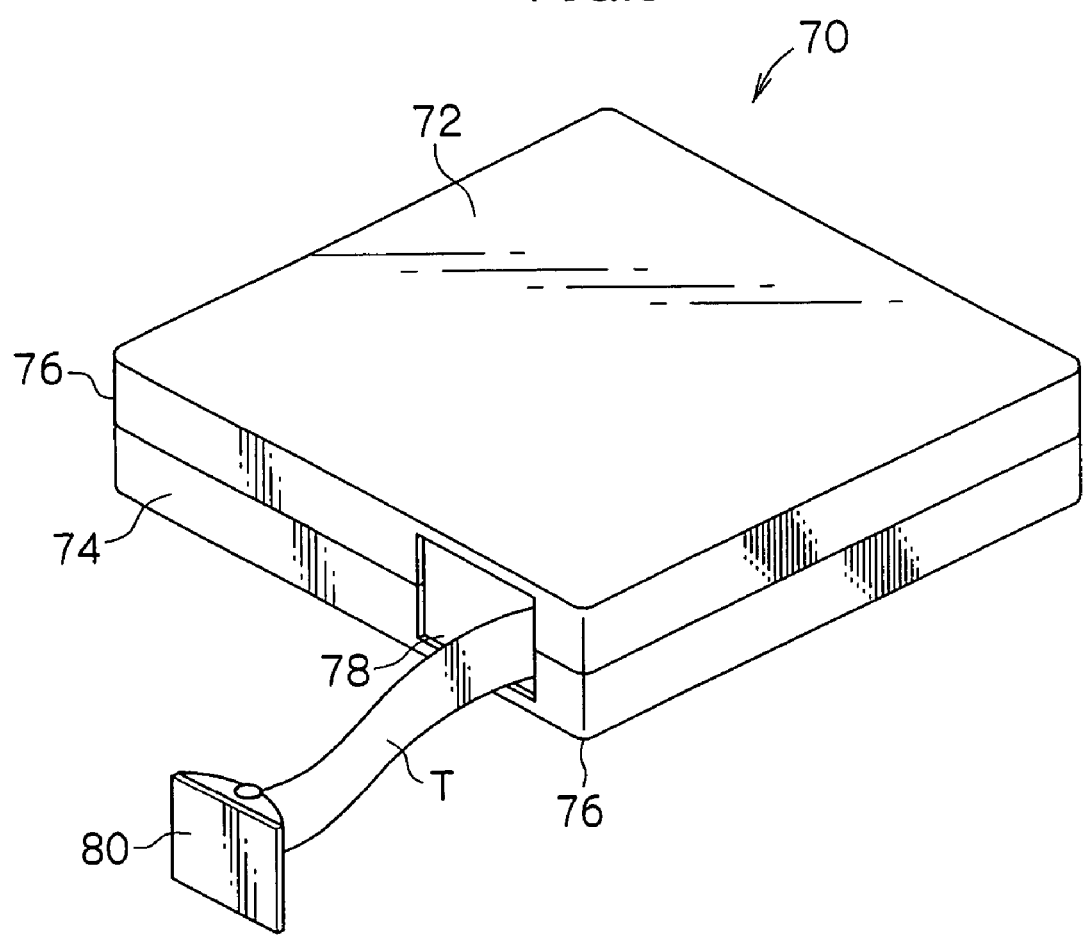
FIG. 8 is a schematic perspective view, viewed from above, of a conventional recording tape cartridge.

When the leader block 30 has been returned into the case 12 in this manner, the recording tape cartridge 10 ascends or the rotation shaft descends, and the release member 90 is withdrawn from the aperture 17. Correspondingly, because the leader block 30 is urged downward by the leaf spring 50, the leader block 30 moves downward while still being supported by the release member 90 and, as shown in FIG. 7B, closes off the aperture 20. In addition, the lower face of the leader block 30 closes off the aperture 17, and the portion (the lower portion) of the left side face 30L of the leader block 30 is covered by the projection portion 12C.

At the same time, the meshing of the (unillustrated) driving gear with the reel gear 28 is released, the (unillustrated) release member is withdrawn from the through-hole 18A, and the reel 18 is locked by the locking mechanism 62 so as not to rotate undesiredly. That is, the reel 18 is moved downward and anchored by urging force of the coil spring 60.

Here, because the descent of the reel 18 and the descent of the leader block 30 are interlockingly performed at the same time, the height positions of the reel 18 and the leader block 30 are always the same. That is, the magnetic tape T descends while being parallel with the floor plate 16A (and the ceiling plate 14A). Therefore, problems such as the magnetic tape T twisting and the magnetic tape T becoming creased will not occur even at this time, and problems such as an edge of the magnetic tape T making contact with and being damaged by the upper flange 19 of the reel 18 will not occur.

At the same time, the positioning pins are withdrawn from the positioning holes 24 and 26, and the state of positioning of the recording tape cartridge 10 relative to the drive device is released. Thereafter, the recording tape cartridge 10 is moved in a direction opposite to the direction of arrow A by an unillustrated ejection mechanism, and is ejected from inside the drive device.

As has been described above, because the aperture 20 of the recording tape cartridge 10 is formed at a predetermined position of the front wall 12A, which is to say a position which is separated from a corner portion by at least the plate thickness of the case 12, the leader block 30 is unlikely to disengage from the aperture 20 even if an impact is applied to that corner portion by a fall or the like. Moreover, because the leader block 30 is restrained (is urged downward) by a predetermined force from the leaf spring 50, the leader block 30 is even less likely to disengage. Furthermore, because the corner portions are fixed with screws, impact resistance is further improved. As a result, users will not be subjected to worry about unwanted detachment of the leader block 30.

Further, at times of non-use when the recording tape cartridge 10 is not loaded in a drive device, the leader block 30 is urged downward by the leaf spring 50, the reel 18 is urged downward by the coil spring 60, and height positions of the leader block 30 and the reel 18 are equivalent. Hence, at a time of use when the recording tape cartridge 10 is loaded in a drive device, because the leader block 30 and the reel 18 interlockingly ascend or descend simultaneously, the height positions of the reel 18 and the leader block 30 are continuously equivalent. That is, the magnetic tape T moves to ascend or descend within the case 12 in a manner which is parallel with the floor plate 16A (and the ceiling plate 14A).

Therefore, problems such as the magnetic tape T being twisted and wrinkles forming in the magnetic tape T will not occur. Further, problems such as an edge of the magnetic tape T contacting the upper flange 19 of the reel 18 and getting damaged will not occur. Accordingly, it is possible to draw out the magnetic tape T in an excellent manner. Further still, because the leader block 30 is disposed at the inner side of the aperture 20 such that a portion (the lower portion) of the left side face 30L is covered by the projection portion 12C, the leader block 30 is less likely to be damaged or the like. As a result, dimensional accuracy of the leader block 30 can be constantly maintained.

Furthermore, the aperture 20 need not be provided at the front wall 12A side, and could be provided at, for example, a right wall 12B side. That is, the leader block 30 is not limited to structures which are disposed to be parallel with the front wall 12A, and may be disposed to be parallel with the right wall 12B, and may be disposed so as to be angled with respect to both the front wall 12A and the right wall 12B. Disposing the leader block 30 to be angled or parallel relative to the front wall 12A is advantageous in that it is possible, in design, to freely select an angle of drawing out by a drawing-out member that is to be provided at a drive device. Thus, because it is possible to design such that, for example, the leader block 30 is drawn out along a shortest distance to a drive device side winding reel, it is possible to complete the operation of drawing out the magnetic tape T in a short time.

What is claimed is:

1. A recording tape cartridge comprising:
   a case which rotatably and vertically movably accommodates a single reel on which recording tape is wound;
   an aperture formed in a peripheral wall of the case for enabling drawing out of the recording tape;
   a projection portion which projects upward from a lower edge of the aperture;
   a leader block fixed to an end portion of the recording tape, the leader block being capable of being drawn out by a drawing-out mechanism of a drive device, and capable of closing the aperture;
   a first urging member disposed between a ceiling plate at an upper side of the case and the reel, for urging the reel downward; and
   a second urging member mounted at the ceiling plate at the upper side of the case, for urging the leader block that is closing the aperture downward further than the projection portion.

2. The recording tape cartridge of claim 1, wherein, when the recording tape cartridge is loaded at the drive device, the leader block moves interlockingly with the reel at the same height as the reel.

3. The recording tape cartridge of claim 1, wherein the aperture is formed in the peripheral wall of the case at a side of loading into the drive device, apart from a corner portion of the case.

4. The recording tape cartridge of claim 1, wherein the case comprises ribs which protrude from, respectively, the upper side ceiling plate and a floor plate at the lower side of the case in a vicinity of the aperture, and the ribs include forms for engaging with the leader block.

5. The recording tape cartridge of claim 4, wherein the leader block closes the aperture by being retained between the ribs and the aperture.

6. The recording tape cartridge of claim 4, wherein the ribs form a gap therebetween through which the recording tape can pass, the gap between the ribs being smaller than a vertical width of the aperture.

7. The recording tape cartridge of claim 1, wherein the case comprises a through-hole through at least the lower side floor plate, the through-hole allowing a portion of the drive device to be inserted therethrough and the leader block to be moved in a width direction of the leader block when the recording tape cartridge is loaded at the drive device.

8. The recording tape cartridge of claim 1, wherein the first urging member comprises a coil spring, and the first urging member urges the reel toward the lower side floor plate at times of non-use of the recording tape cartridge for anchoring the reel.

9. The recording tape cartridge of claim 1, wherein incisions are formed in the upper side ceiling plate and the lower side floor plate of the case, respectively continuously from edge portions of the aperture, for enabling ingression of the drawing-out mechanism of the drive device when the recording tape cartridge is loaded at the drive device.

10. A recording tape cartridge comprising:
    a case which rotatably accommodates, between a pair of plates which oppose one another, a single reel, on which recording tape is wound, such that the reel is movable between the pair of plates, the case including, between the pair of plates, a side wall which surrounds the reel, and an aperture being formed in the side wall for enabling drawing out of the recording tape;

a projection portion which is formed so as to project from an edge portion of the aperture at one of the plates toward an edge portion of the aperture at the other of the plates;

a leader block fixed to an end portion of the recording tape, the leader block being capable of closing the aperture when disposed at an inner side of the case relative to the projection portion, and, when the recording tape cartridge is loaded at a drive device, the leader block engaging with a portion of the drive device for enabling drawing out of the recording tape;

a first urging member disposed between the other of the plates and the reel, for urging the reel toward the one of the plates; and a second urging member mounted at the other of the plates, for urging the leader block that is closing the aperture toward the one of the plates.

11. The recording tape cartridge of claim 10, wherein the second urging member urges the leader block further toward the one of the plates than an edge portion of the projection portion.

12. The recording tape cartridge of claim 10, wherein the case comprises ribs which protrude from each of the pair of plates in a vicinity of the aperture, and the ribs include forms for engaging with the leader block.

13. The recording tape cartridge of claim 12, wherein the leader block closes the aperture by being retained between the ribs and the aperture.

14. The recording tape cartridge of claim 12, wherein the ribs form a gap therebetween through which the recording tape can pass, the gap between the ribs being smaller than a width of the aperture.

15. The recording tape cartridge of claim 10, wherein the leader block and the reel comprise structures for maintaining the same position as one another in a width direction of the recording tape cartridge when the recording tape cartridge is loaded at the drive device.

16. The recording tape cartridge of claim 10, wherein the case comprises a through-hole through at least the one of the plates, the through-hole allowing another portion of the drive device to be inserted therethrough and the leader block to be moved in a width direction of the leader block when the recording tape cartridge is loaded at the drive device.

17. The recording tape cartridge of claim 10, wherein the first urging member comprises a coil spring, and the first urging member urges the reel toward the one of the plates at times of non-use of the recording tape cartridge for anchoring the reel.

18. The recording tape cartridge of claim 10, wherein incisions are formed in the pair of plates, respectively continuously from edge portions of the aperture, for enabling ingression of the portion of the drive device when the recording tape cartridge is loaded at the drive device.

* * * * *